(12) United States Patent
Morimoto

(10) Patent No.: US 8,430,787 B2
(45) Date of Patent: Apr. 30, 2013

(54) POWER TRANSMISSION DEVICE FOR WORK VEHICLE

(75) Inventor: Tetsuya Morimoto, Nomi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/502,360

(22) PCT Filed: Nov. 17, 2010

(86) PCT No.: PCT/JP2010/070426
§ 371 (c)(1),
(2), (4) Date: Apr. 16, 2012

(87) PCT Pub. No.: WO2011/062172
PCT Pub. Date: May 26, 2011

(65) Prior Publication Data
US 2012/0202640 A1     Aug. 9, 2012

(30) Foreign Application Priority Data

Nov. 19, 2009   (JP) ................................. 2009-263893

(51) Int. Cl.
*F16H 3/44* (2006.01)
(52) U.S. Cl.
USPC ......................................................... 475/323
(58) Field of Classification Search .................... 475/323
See application file for complete search history.

(56) References Cited

U.S. PATENT DOCUMENTS

| 5,024,636 | A | 6/1991 | Phebus et al. | |
| 6,491,600 | B1 | 12/2002 | Smemo et al. | |
| 2002/0119859 | A1* | 8/2002 | Raghavan et al. | 475/317 |
| 2007/0202984 | A1* | 8/2007 | Gumpoltsberger | 475/323 |
| 2009/0017981 | A1* | 1/2009 | Hukill et al. | 475/323 |

FOREIGN PATENT DOCUMENTS

| JP | 6-507221 A | 8/1994 |
| JP | 2000-65161 A | 3/2000 |
| JP | 2000-136852 A | 5/2000 |
| JP | 2005-48864 A | 2/2005 |

OTHER PUBLICATIONS

International Search Report of corresponding PCT Application No. PCT/JP2010/070426.

* cited by examiner

*Primary Examiner* — Edwin A Young
(74) *Attorney, Agent, or Firm* — Global IP Counselors, LLP

(57) ABSTRACT

A power transmission device includes a first planetary gear reducer, a second planetary gear reducer and a hydraulic clutch mechanism. The first planetary gear reducer includes: a first sun gear receiving torque inputted thereto; a first carrier supporting plural first planet gears; and a first ring gear coupled to a wheel. The second planetary gear reducer includes: a second sun gear coupled to the first carrier; a second carrier, coupled to the hydraulic clutch mechanism while supporting plural second planet gears; and a second ring gear coupled to the first ring gear and the wheel. The hydraulic clutch mechanism includes a rotary part coupled to the second carrier and a stationary part configured to be coupled/decoupled to/from the rotary part.

3 Claims, 6 Drawing Sheets

POWER TRANSMISSION DEVICE FOR WORK VEHICLE

CROSS-REFERENCE TO RELATED APPLICATIONS

This application claims priority to Japanese Patent Application No. 2009-263893, filed on Nov. 19, 2009, the disclosure of which is hereby incorporated herein by reference in its entirety.

BACKGROUND OF THE INVENTION

1. Field of the Invention

The present invention relates to a power transmission device, particularly to a power transmission device for a work vehicle, which is configured to transmit torque from a driving source to a wheel.

2. Background Art

Driving devices, described in Publication of U.S. Pat. No. 6,491,600 and Japan Laid-open Patent Application Publication No. JP-A4105-193373, have been provided as exemplary driving devices for work vehicles such as motor graders. The devices include a hydraulic motor and a power transmission device. The power transmission device includes a two-stage planetary gear reducer and is configured to transmit torque of the hydraulic motor to a wheel.

FIG. 1 illustrates a schematic diagram of the driving device described in Publication of U.S. Pat. No. 6,491,600. In FIG. 1, a reference numeral "CL" indicates a rotary axis. In the driving device, torque from a motor 1 is inputted into a sun gear 2 of a first stage. Further, a carrier 3 of the first stage is coupled to a sun gear 4 of a second stage, while a ring gear 5 of the first stage is coupled to a carrier 6 of the second stage and a wheel. Yet further, a ring gear 7 of the second stage is coupled to a stationary housing 9 through a clutch mechanism 8.

On the other hand, FIG. 2 illustrates a schematic diagram of the driving device described in Japan Laid-open Patent Application Publication No. JP-A-1105-193373. In the driving device, torque from the motor 10 is inputted into a sun gear 12 of a first stage through a pair of reduction gears 11a and 11b. Further, a carrier 14 of the first stage is coupled to a sun gear 15 of a second stage, while a ring gear 16 of the first stage is coupled to a ring gear 17 of the second stage. The ring gears 16 and 17 are also coupled to a wheel through a clutch mechanism 18. Yet further, a carrier 19 of the second stage is coupled to a stationary housing 20.

FIG. 1 depicts a torque transmission path in the device of Publication of U.S. Pat. No. 6,491,600 with arrows. Torque inputted in the sun gear 2 of the first stage is herein combined with torque from the ring gear 5 of the first stage, and the resultant torque is inputted into the sun gear 4 of the second stage through the carrier 3 of the first stage. Torque inputted into the sun gear 4 of the second stage is combined with torque from the ring gear 7 of the second stage, and the resultant torque is transmitted to the carrier 6 of the second stage. Torque reaction force of the ring gear 7 of the second stage is applied to the stationary housing 9 through the clutch mechanism 8. A part of the torque transmitted to the carrier 6 of the second stage drives the wheel, while the rest of the torque (see a path depicted with a broken line in FIG. 1) is returned to the planetary gear reducer of the first stage as the reaction force of the aforementioned ring gear 5 of the first stage. In short, torque is circulated through the device described in Publication of U.S. Pat. No. 6,491,600. Due to this, relatively large torque is required for driving the wheel. Especially, members forming the planetary gear reducer of the second stage are herein required to have a durable structure against such relatively large torque. Consequently, the device is inevitably formed in a large size.

On the other hand, in the device of Japan Laid-open Patent Application Publication No. JP-A-H05-193373, the input side of the clutch mechanism 18 is coupled to the ring gears 16 and 17, while the output side thereof is coupled to the wheel. Therefore, the clutch mechanism 18 is required to couple or decouple rotatable members. Now, the clutch mechanism 18 is generally formed by members such as a piston configured to be actuated by means of hydraulic pressure. In the device of Japan Laid-open Patent Application Publication No JP-A-H05-193373, members such as a piston are disposed on the rotatable members. In this type of structure, oil for actuating the piston is required to be supplied from a stationary side portion to the rotatable members. However, it is difficult to seal between the stationary side portion and the rotatable members. Therefore, a complex structure is required for preventing oil leakage from the part.

it is an object of the present invention to achieve efficient torque transmission and a seal structure of a hydraulic circuit continued to a clutch mechanism with a simple structure.

SUMMARY

A power transmission device for a work vehicle according to a first aspect of the present invention is configured to transmit torque from a driving source to a wheel. The power transmission device includes a first planetary gear reducer, a second planetary gear reducer and a hydraulic clutch mechanism. The first planetary gear reducer is configured to receive the torque inputted from the driving source and transmit the torque to the wheel. The first planetary gear reducer includes a first sun gear, a plurality of first planet gears, a first carrier and a first ring gear. The first sun gear is coupled to the driving source. The plural first planet gears are meshed with the first sun gear. The first carrier supports the plural first planet gears in a rotatable state. The first ring gear is meshed with the plural first planet gears while being coupled to the wheel. The second planetary gear reducer is configured to transmit the torque to the wheel together with the first planetary gear reducer. The second planetary gear reducer includes a second sun gear, a plurality of second planet gears, a second carrier and a second ring gear. The second sun gear is coupled to the first carrier. The plural second planet gears are meshed with the second sun gear. The second carrier supports the plural second planet gears in a rotatable state. The second ring gear is meshed with the plural second planet gears while being coupled to the wheel. The hydraulic clutch mechanism includes a rotary part and a stationary part. The rotary part is coupled to the second carrier. The stationary part is configured to be coupled to or decoupled from the rotary part.

In the power transmission device, torque from the driving source is inputted into the first sun gear. When the hydraulic clutch mechanism is turned on (i.e., power transmission is permitted), rotation of the second carrier is prevented. The inputted torque is herein combined with torque from the first carrier, and the combined torque is transmitted to the first ring gear. On the other hand, torque from the second carrier is divided and distributed to the second sun gear and the second ring gear. The torque distributed to the second sun gear is transmitted to the first carrier. The torque distributed to the second ring gear is combined with the torque of the first ring gear and drives the wheel. Reflection force of the torque of the second carrier is applied to a stationary side member through the clutch mechanism. Thus, the wheel is configured to be driven by both of the torque from the first planetary gear reducer and that from the second planetary gear reducer.

By contrast, when the hydraulic clutch mechanism is turned off (i.e., power transmission is prevented), the second carrier is rotated while the respective planetary gear reducers are prevented from transmitting torque.

Unlike the driving device described in Publication of U.S. Pat. No. 6,491,600, the power transmission device of the first aspect of the present invention is not structured for circulating torque. Therefore, it is possible to further reduce torque to be transmitted by the second planetary gear reducer, compared to the driving device described in Publication of U.S. Pat. No. 6,491,600. In other words, the power transmission device can be compactly formed. Further, the hydraulic clutch mechanism is configured to allow or prevent rotation of the second carrier. In other words, one side (i.e., a part different from the second carrier) is stationary. Therefore, a hydraulic circuit can be thrilled in the stationary side part, and oil leakage can be inhibited with a simple seal structure.

A power transmission device for a work vehicle according to a second aspect of the present invention relates to the power transmission device for a work vehicle according to the first aspect of the present invention. In the power transmission device, the first planetary gear reducer and the second planetary gear reducer are aligned in a rotary axis direction. Further, the first planetary gear reducer further includes a plurality of first support shafts. Each of the first support shafts herein supports each of the first planet gears in a rotatable state with respect to the first carrier. Likewise, the second planetary gear reducer further includes a plurality of second support shafts. Each of the second support shafts supports each of the second planet gears in a rotatable state with respect to the second carrier. Yet further, the first support shafts and the second support shafts are axially overlapped in radially different positions.

According to the power transmission device for a work vehicle of the second aspect of the present invention, the support shafts supporting the first planet gears and those supporting the second planet gears are axially overlapped. Therefore, the power transmission device can be compactly formed in the axial direction.

A power transmission device for a work vehicle according to a third aspect of the present invention relates to the power transmission device for a work vehicle according to the second aspect of the present invention. In the power transmission device, the first carrier and the second carrier are radially overlapped. Further, the power transmission device thither includes a thrust washer. The thrust washer is disposed between radially overlapped portions of the first and second carriers while both faces thereof respectively make contact with the first and second carriers.

According to the power transmission device for a work vehicle of the third aspect of the present invention, the first and second carriers are disposed while slidably making contact with the respective faces of the thrust washer. In other words, the both carries are herein disposed closer to each other. Therefore, the power transmission device can be compactly formed in the axial direction.

Advantageous Effects of Invention

As described above, the power transmission device tier a work vehicle according to the present invention can achieve efficient torque transmission and a seal structure of a hydraulic circuit continued to a hydraulic clutch mechanism with a simple structure.

BRIEF DESCRIPTION OF THE DRAWINGS

Referring now to the attached drawings which form a part of this original disclosure.

DETAILED DESCRIPTION OF THE EMBODIMENTS

General Structure

Figure 1:
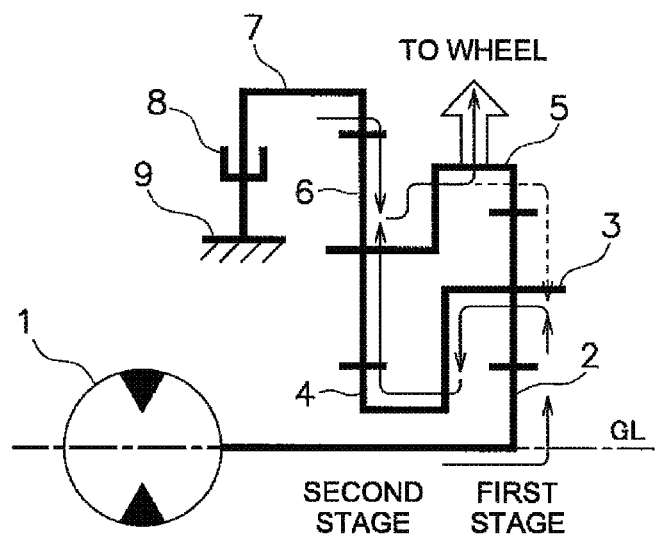
FIG. 1 is a schematic diagram of a well-known power transmission device.
Figure 2:
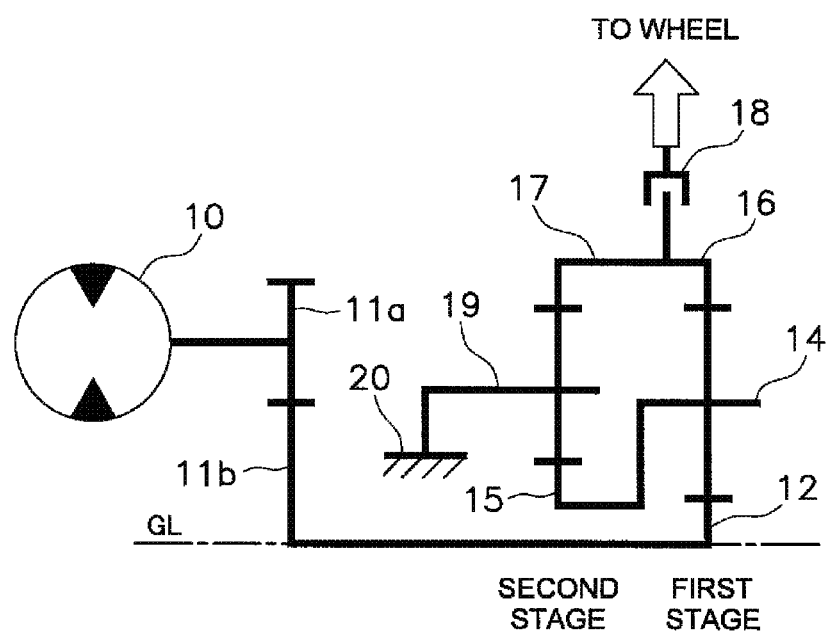
FIG. 2 is a schematic diagram of another well-known power transmission device.
Figure 3:
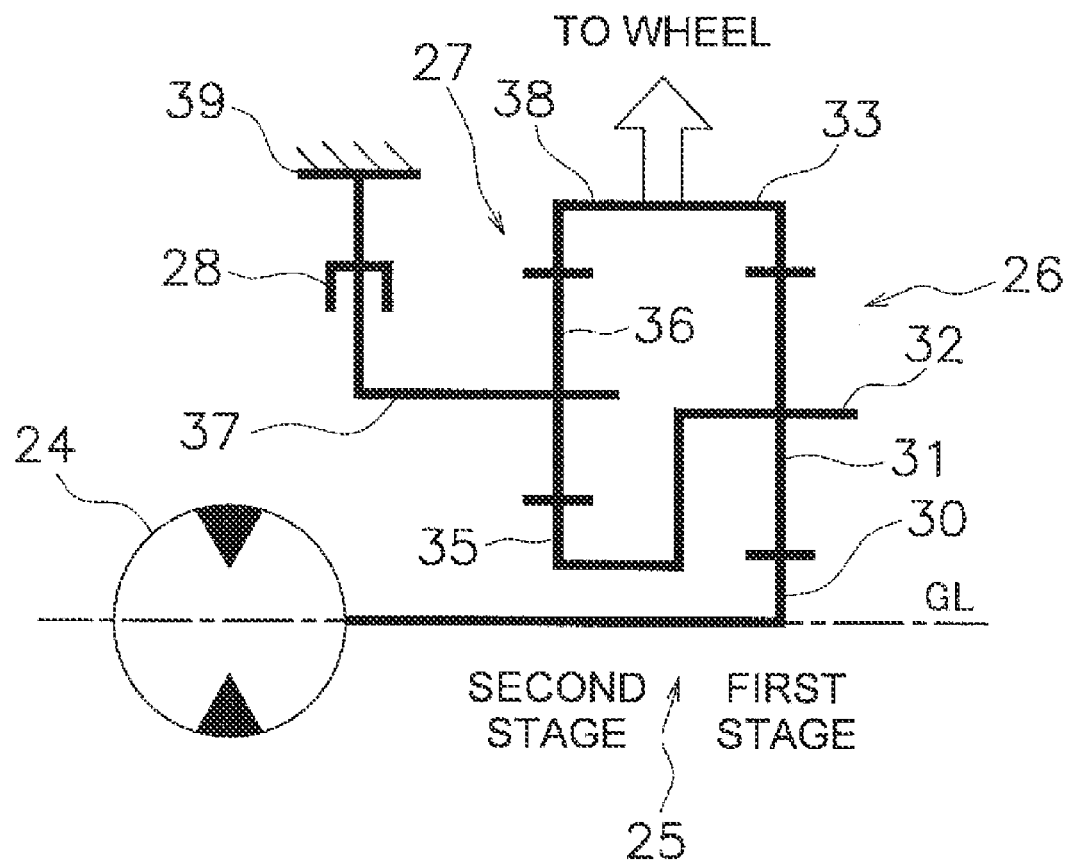
FIG. 3 is a schematic diagram of a power transmission device according to an exemplary embodiment of the present invention.

FIG. 3 illustrates a schematic diagram of a driving device embedded with a power transmission device according to an exemplary embodiment of the present invention. In FIG. 3, a reference numeral "CL" indicates a rotary axis.

The driving device includes a hydraulic motor 24 as a driving source and a power transmission device 25 configured to transmit torque of the hydraulic motor 24 to a wheel. The power transmission device 25 includes a first planetary gear reducer 26, a second planetary gear reducer 27 and a hydraulic clutch mechanism 28.

The first planetary gear reducer 26 includes a first sun gear 30, a plurality of first planet gears 31, a first carrier 32 and a first ring gear 33. On the other hand, the second planetary gear reducer 27 includes a second sun gear 35, a plurality of second planet gears 36, a second carrier 37 and a second ring gear 38.

In the driving device, torque from the hydraulic motor 24 is inputted into the first sun gear 30. Further, the first carrier 32 is coupled to the second sun gear 35, while the first ring gear 33 is coupled to the second ring gear 38. Yet further, the ring gears 33 and 38 are coupled to the wheel, On the other hand, the second carrier 37 is coupled to a stationary housing 39 through the hydraulic clutch mechanism 28.

Detailed Structure

Figure 4:
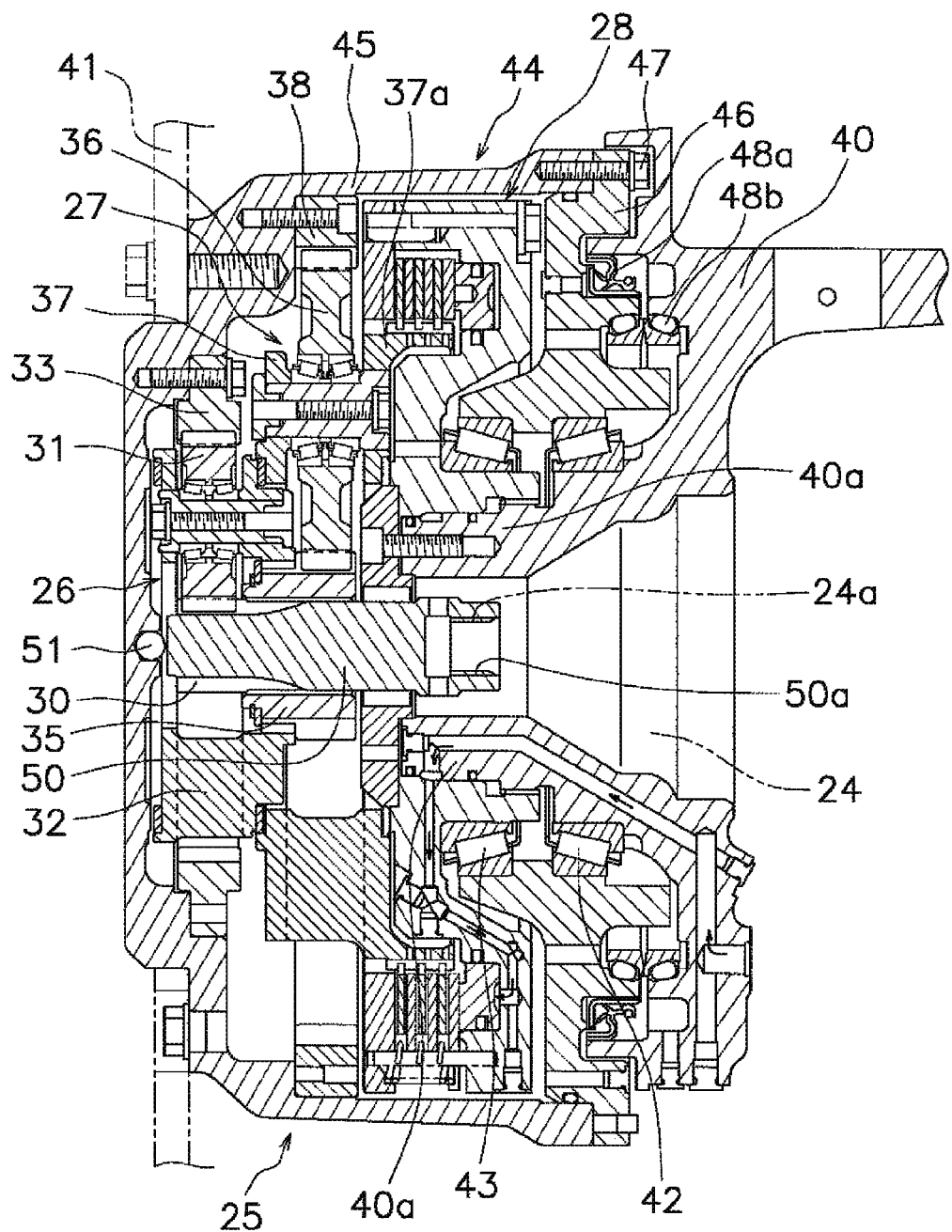
FIG. 4 is a cross-sectional diagram of the entire structure of the power transmission device of the exemplary embodiment.

FIG. 4 and subsequent figures illustrate the aforementioned structure according to an exemplary embodiment. In the exemplary embodiment, the power transmission device of the present invention is applied to a device configured to drive tires (wheels) of a motor grader. It should be noted in FIG. 4 and subsequent figures that the same reference numerals are assigned to members identical to those in FIG. 3.

As illustrated in FIG. 4, the hydraulic motor 24 is accommodated in a vehicle body side part of a motor housing 40. An output shaft 24a of the hydraulic motor 24 is disposed concentrically to a rotary shaft of a wheel 41. Further, the motor housing 40 includes a protruded portion 40a in its center part. The protruded portion 40a is protruded towards a vehicle body outer side (i.e., leftwards in FIG 4). The power transmission device 25 and the wheel 41 are rotatably supported by the protruded portion 40a of the motor housing 40 through two tapered roller bearings 42 and 43.

The power transmission device 25 includes a casing 44 for accommodating the first and second planetary gear reducers 26 and 27 and the hydraulic clutch mechanism 28. The casing 44 includes a housing 45 and a housing cover 46. The housing 45 is a bowl-shaped member opened towards the motor housing 40. The housing cover 46 is fixed to the opening side of the housing 45. The housing 45 and the housing cover 46 are fixed by means of a plurality of bolts 47. Further, the housing cover 46 is rotatably supported by the motor housing 40 through the aforementioned tapered roller bearings 42 and 43. It should be noted that an oil seal 48a and a floating seal 48b are provided between the housing cover 46 and the motor housing 40 in order to prevent oil contained within the casing 44 from leaking to the outside.

First Planetary Gear Reducer

The first planetary gear reducer 26 is disposed on the vehicle body outer side. The first sun gear 30 is integrally formed with an input shaft 50. The input shaft 50 is disposed concentrically to a center axis of the wheel 41. The input shaft 50 includes a spline hole 50a in its tip on a motor side (i.e., a vehicle body inner side, the right side in FIG. 4). The tip of the motor shall 24a of the hydraulic motor 24 is engaged with the spline hole 50a. Further, the input shaft 50 includes the first sun gear 30 formed on the vehicle body outer side tip thereof. It should be noted that a ball 51 is disposed between the housing 45 and the vehicle body outer side tip surface of the input shaft 50 in order to support the tip of the input shaft 50.

Figure 5:
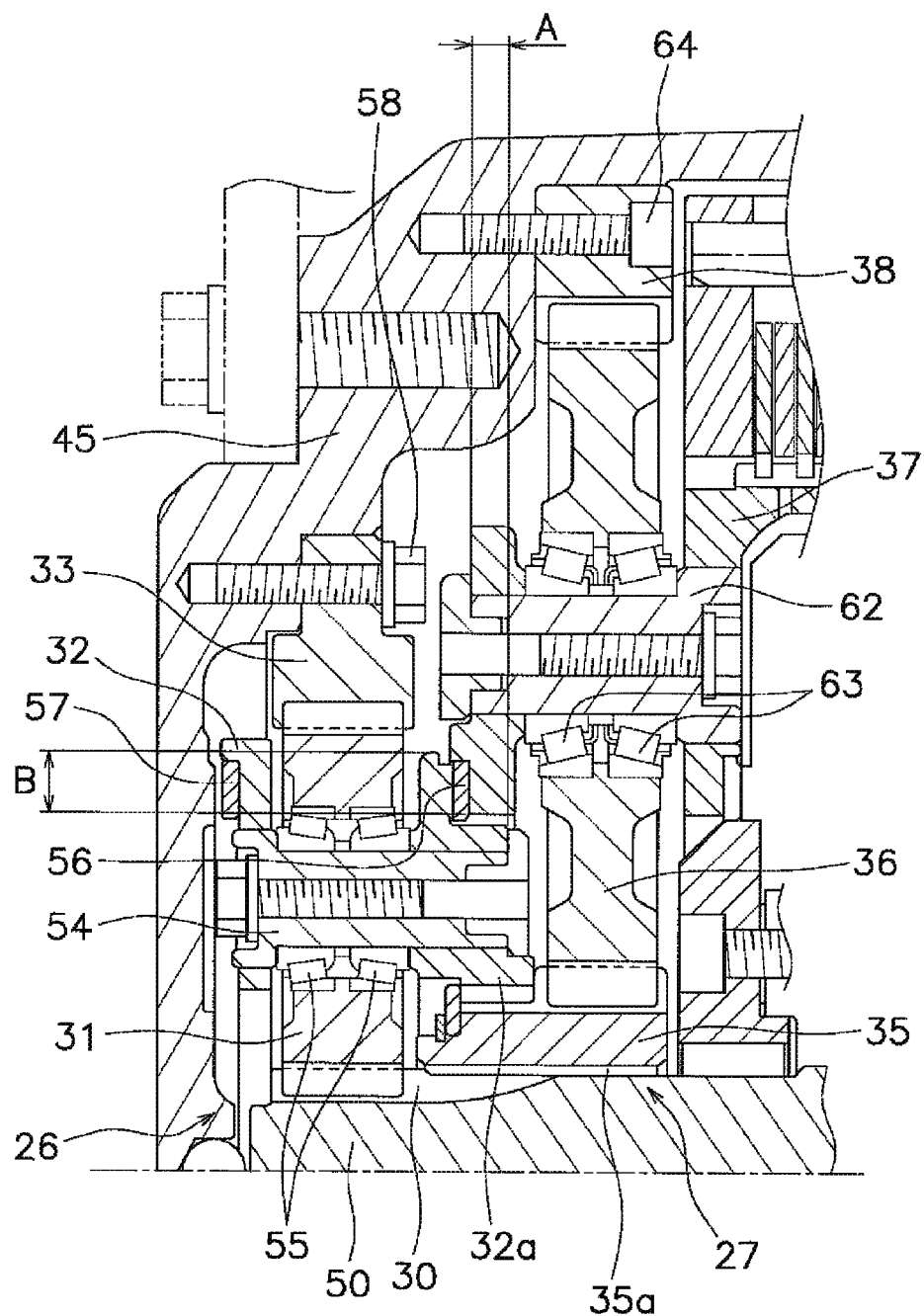
FIG. 5 is a cross-sectional diagram of the structure of first and second planetary gear reducers of the power transmission device of the exemplary embodiment.

As illustrated in FIG. 4 and FIG. 5 as an enlarged partial view of FIG. 4, the plural first planet gears 31 are respectively meshed with the first sun gear 30 while being rotatably supported by the first carrier 32. The first earlier 32 includes a plurality of radially penetrating slits arranged at predetermined intervals in a circumferential direction. The first planet gears 31 are respectively disposed in the slits. Each first planet gear 31 is rotatably disposed onto a first support pin 54 axially penetrating each slit through two tapered roller bearings 55. Further, the first carrier 32 includes an axially protruded coupling ring 32 on the vehicle body inner side of the inner periphery thereof. The coupling ring 32a includes a plurality of teeth on the inner peripheral surface thereof.

Thrust washers 56 and 57 are disposed on the outer peripheral part of the vehicle body inner side face of the first carrier 32 and the outer peripheral part of the vehicle body outer side face of the first carrier 32. One of the thrust washers (i.e., the thrust washer 56) is disposed between the first carrier 32 and the second earlier 37, whereas the other of the thrust washers (i.e., the thrust washer 57) is disposed between the first carrier 32 and the inner surface of the housing 45.

The first ring gear 33 is fixed to the housing 45 by means of a plurality of bolts 58 and is thereby coupled to the wheel 41. The plural first planet gears 31 are meshed with the first ring gear 33.

Second Planetary Gear Reducer

The second planetary gear reducer 27 is axially aligned with the first planetary gear reducer 26. More specifically, the second planetary gear reducer 27 is disposed closer to the hydraulic motor 24 (i.e., more vehicle body inner side) than the first planetary gear reducer 26 is. As illustrated in FIG. 5, the second sun gear 35 includes a hole 45a axially penetrating the center part thereof. The input shaft 50 penetrates the hole 35a. The second sun gear 35 includes a plurality of teeth on a vehicle body outer side part of the outer peripheral surface thereof. The plural teeth of the coupling ring 32a of the first carrier 32. are meshed with the teeth of the second sun gear 35.

Figure 6:
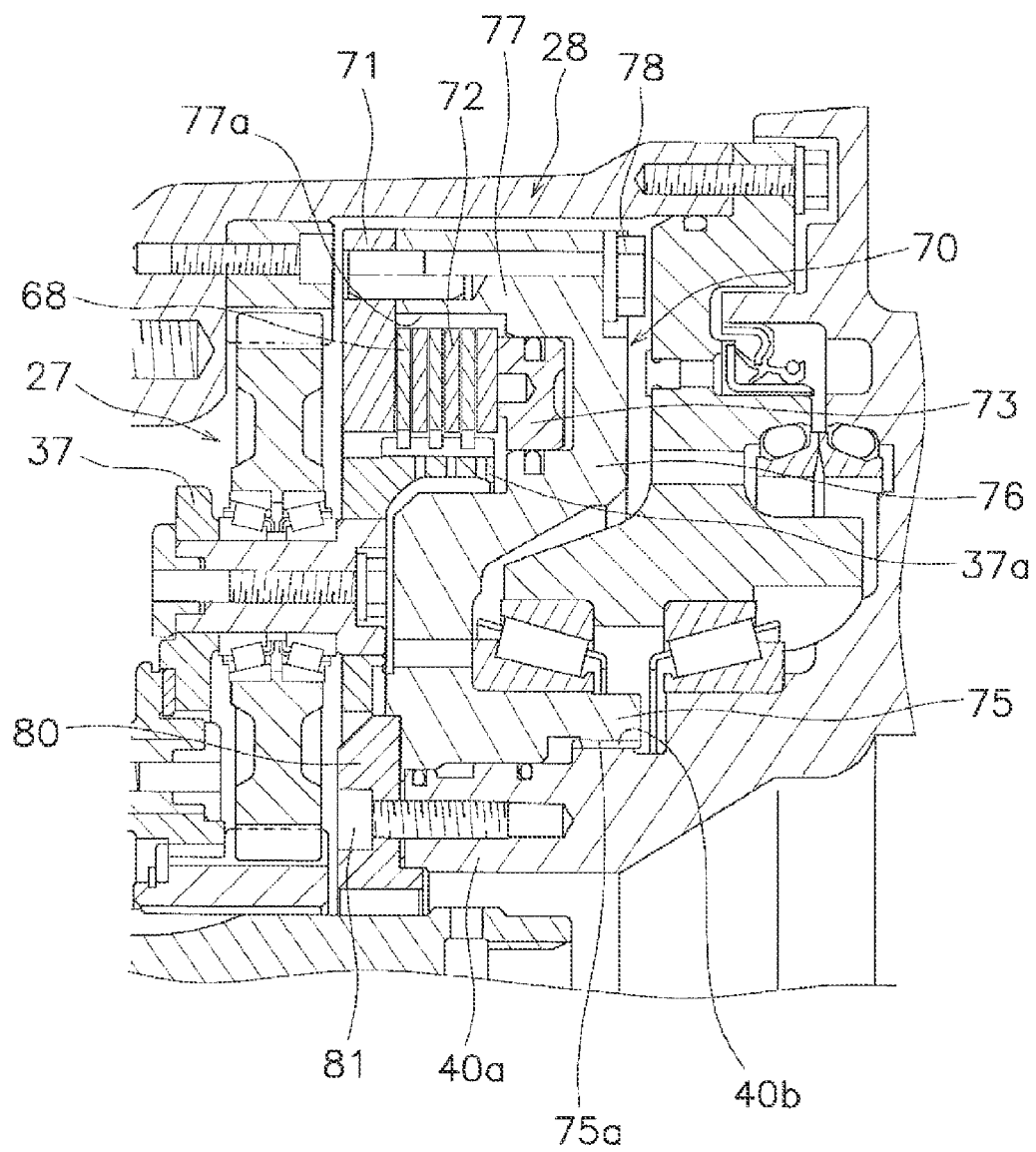
FIG. 6 is a cross-sectional diagram of the structure of a brake mechanism of the power transmission device of the exemplary embodiment.

The plural second planet gears 36 are rotatably supported by the second carrier 37. respectively. The second planet gears 36 are meshed with the teeth formed on a vehicle body inner side part of the second sun gear 35. Similarly to the first carrier 32, the second carrier 37 includes a plurality of radially penetrating slits aligned at predetermined intervals in the circumferential direction. The second planet gears 36 are respectively disposed in the slits. Each second planet gear 36 is rotatably disposed onto a second support pin 62 axially penetrating each slit through two tapered roller bearings 63. As illustrated in FIGS. 4 and 6, on the other hand, the second carrier 37 includes an axially protruded clutch input portion 37a formed on the outer peripheral end of the vehicle body inner side face of the second carrier 37.

As described above, it should be noted that the vehicle body outer side face of the inner peripheral part of the second carrier 37 makes contact with the vehicle body inner side face of the outer peripheral part of the first carrier 32 through the thrust washer 56.

The second ring gear 38 is fixed to the housing 45 by means of a plurality of bolts 64. Accordingly, the second ring gear 38 is coupled to the wheel 41 together with the first ring gear 33. The plural second planet gears 36 are meshed with the second ring gear 38.

Arrangement of First and Second Planetary Gear Reducers

As is Obvious from FIG. 5, the first support pins 54 of the first planetary gear reducer 26 and the second support pins 62 of the second planetary gear reducer 27 are disposed in radially different positions. Further, the first support pins 54 and the second support pins 62 are axially overlapped in a range A illustrated in FIG. 5. Yet further, the first carrier 32 and the second carrier 37 are radially overlapped. More specifically, the second-carrier-side outer peripheral end of the first carrier 32 is extended radially outwards of the first-carrier-side inner peripheral end of the second carrier 37. Further, the first carrier 32 and the second carrier 37 are radially overlapped in a range B illustrated in FIG. 5. The thrust washer 56 is disposed in the overlapped region while slidably making contact with the faces of the first and second carriers 32 and 37.

Hydraulic Clutch Mechanism

FIG. 6 is an enlarged partial view of FIG. 4 and mainly illustrates the hydraulic clutch mechanism 28. When being turned on, the hydraulic clutch mechanism 28 is configured to prevent rotation of the second carrier 37 of the second planetary gear reducer 27 (i.e., allow power transmission). When being turned off, on the other hand, the hydraulic clutch mechanism 28 is configured to allow rotation of the second carrier 37 (i.e., prevent power transmission). The hydraulic clutch mechanism 28 includes a rotary part and a stationary part.

The rotary part includes the clutch input portion 37a formed on a part of the second carrier 37 and a plurality of clutch plates 68 (three clutch plates 68 in this example). The clutch input portion 37a includes a spline shaft formed on the outer peripheral surface thereof along the axial direction. Further, each clutch plate 68 is formed in a ring shape and the inner peripheral surface thereof is formed as a spline hole to be engaged with the spline shaft of the clutch input portion 37a. Further, each clutch plate 68 includes friction facings attached to the both faces thereof. With the structure as described above, the clutch plates 68 are rotatable together with the second carrier 37 while being axially movable along the spline shaft of the clutch input portion 37a.

The stationary part includes a clutch housing 70 (corresponding to the stationary housing 39 in FIG. 3), a pressure plate 71, a plurality of fixation plates 72 (three fixation plates 72 in this example) and a piston 73.

The clutch housing 70 includes an inner peripheral tubular portion 75, a disc portion 76 and an outer peripheral tubular portion 77. The inner peripheral tubular portion 75 is supported by the protruded portion 40a of the motor housing 40. The disc portion 76 is extended radially outwards from the inner peripheral tubular portion 75 The outer peripheral tubular portion 77 is extended from the outer peripheral end of the disc portion 76 to the vehicle body outer side. The disc portion 76 is extended radially outwards from the inner peripheral tubular portion 75. The disc portion 76 is then bent to the vehicle body inner side and is further extended outwards. On the other hand, the outer peripheral tubular portion 77 includes an engaging portion 77a on the inner peripheral surface thereof.

The pressure plate 71 is formed in a ring shape. The pressure plate 71 is fixed to the tip of the outer peripheral tubular portion 77 of the clutch housing 70 by means of a plurality of bolts 78.

Each fixation plate 72 is formed in a ring shape. Each fixation plate 72 includes an engaging portion on the outer periphery thereof. The engaging portion is engaged with the engaging portion 77a of the outer peripheral tubular portion 77 of the clutch housing 70. The fixation plates 72 are thereby attached to the clutch housing 70 while being axially movable and non-rotatable relatively thereto. It should be noted that the clutch plates 68 and the fixation plates 72 are alternately disposed in the axial direction. The clutch plates 68 and the fixation plates 72. are configured to be press-contacted to each other while being interposed between the piston 73 and the pressure plate 71.

Further, the vehicle body inner side part of the inner peripheral surface of the inner peripheral tubular portion 75 is formed as a spline hole 75a. The spline hole 75a is engaged with a spline shaft 40b formed in the protruded portion 40a of the motor housing 40. Further, a fixation member 80 is fixed to the vehicle body outer side end surface of the inner peripheral tubular portion 75 by means of a plurality of bolts 81. With the structure as described above, the stationary part of the hydraulic clutch mechanism 28 including the clutch housing 70 is fixed to the motor housing 40 while being axially immovable and non-rotatable with respect thereto.

Hydraulic Circuit of Hydraulic Clutch Mechanism

Figure 7:
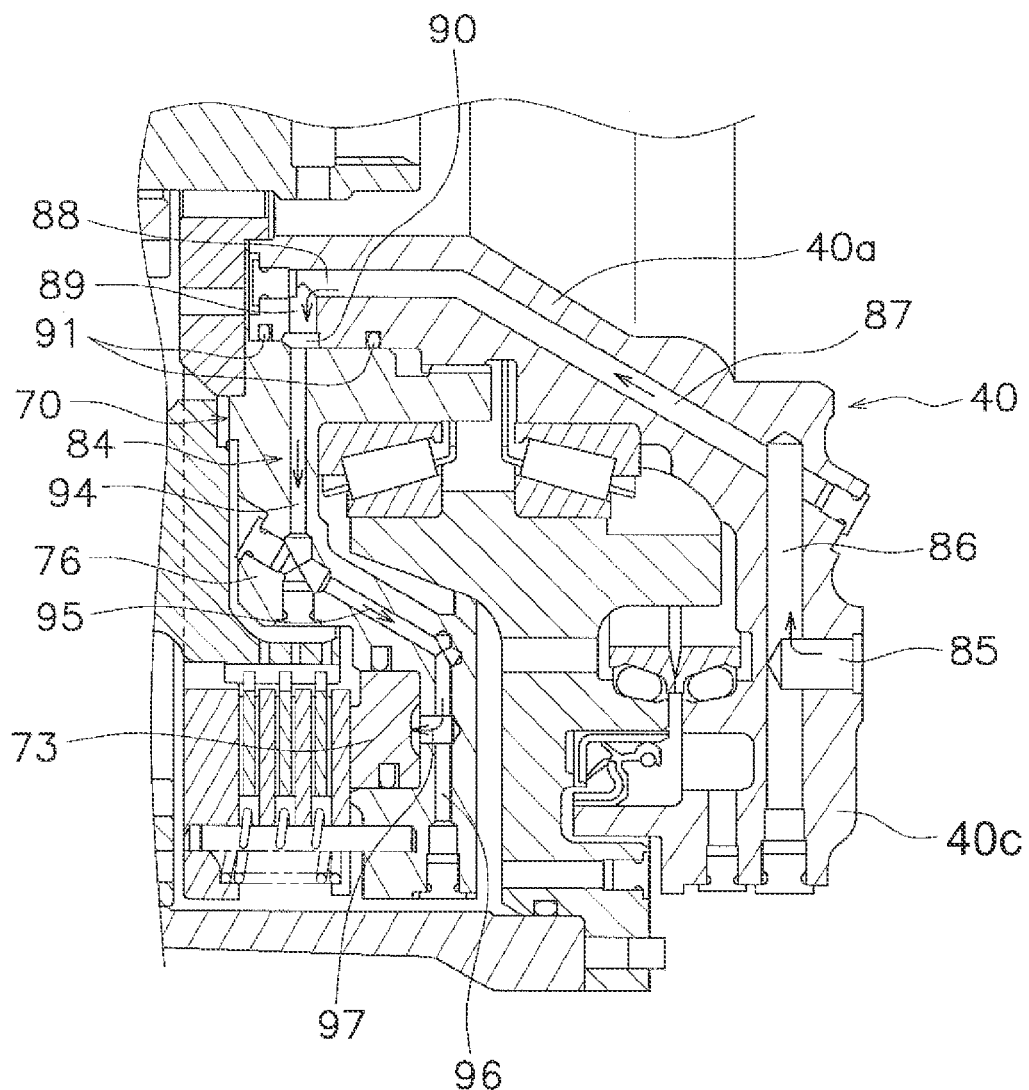
FIG. 7 is a cross-sectional diagram for explaining a hydraulic circuit for actuating the brake mechanism of the power transmission device of the exemplary embodiment.

The hydraulic clutch mechanism 28 is configured to be switched between a clutch-on state, i.e., a brake-on state (fixation of the rotary part=prevention of rotation) and a clutch-off state, i.e., a brake-off state (release of fixation of the rotary part=permission of rotation) by actuating the piston 73. The piston 73 is configured to be actuated by means of hydraulic pressure to be supplied thereto from a control valve (not illustrated in the figures). FIG. 7 illustrates a circuit 84 for supplying the hydraulic pressure. The hydraulic circuit 84 is formed in the motor housing 40 and the clutch housing 70.

The motor housing 40 includes a supply port 85 formed in the radially intermediate part thereof along the axial direction. Further, the motor housing 40 includes a first oil path 86 radially extended in a portion 40c extended radially outwards. The first oil path 86 is communicated with the supply port 85. Further, the motor housing 40 includes a second oil path 87 and a third oil path 88 in the protruded portion 40a. The second oil path 87 is communicated with the distal end of the first oil path 86, while the third oil path 88 is communicated with the distal end of the second oil path 87. The second oil path 87 is obliquely formed from the vehicle body inner side to the vehicle body outer side while getting closer to the radially center part of the motor housing 40. The third oil path 88 is thrilled along the axial direction. Further, the motor housing 40 includes a fourth oil path 89 in the protruded portion 40a. The fourth oil path 89 is communicated with the third oil path 88 while being radially extended from the outer peripheral surface of the protruded portion 40a. The protruded portion 40a includes an annular groove 90 on the outer peripheral surface thereof (i.e., the outer peripheral part of the fourth oil path 89). Further, a pair of seal rings 91 is disposed on the protruded portion 40a while axially interposing the annular groove 90 therebetween.

Further, the clutch housing 70 includes a fifth oil path 94, a sixth oil path 95, a seventh oil path 96 and a discharge port 97 in the inside of the disc portion 76. The fifth oil path 94 is radially extended. The sixth oil path 95 is extended from the outer peripheral part of the fifth oil path 94 to the vehicle body inner side while being slanted radially outwards. The seventh oil path 96 is communicated with the outer peripheral part of the sixth oil path 95 while being extended radially outwards. The discharge port 97 is disposed in the radial intermediate part of the seventh oil path 96. The seventh oil path 96 and a compartment accommodating the piston 73 are communicated through the discharge port 97.

In the hydraulic circuit 84 as described above, the hydraulic pressure, supplied from the control valve to the supply port 85, is supplied to the clutch housing 70 through the first to fourth oil paths 86 to 89 and the annular groove 90 of the motor housing 40. In the clutch housing 70, the hydraulic pressure acts on the piston 73 through the fifth, to seventh oil paths 94 to 96 and the discharge port 97. Both of the motor housing 40 and the clutch housing 70 are herein fixed and non-rotatable. Therefore, oil leakage can be inhibited between the motor housing 40 and the clutch housing 70 by means of a simple seal mechanism formed by the paired seal rings 91.

Actions

In the power transmission device 25 as structured above, the clutch plates 68 and the fixation plates 72 of the hydraulic clutch mechanism 28 are press-contacted when the hydraulic pressure is supplied to the piston 73 through the hydraulic circuit 84. The hydraulic clutch mechanism 28 is accordingly switched into the clutch-on (brake-on) state. Rotation of the second carrier 37 of the second planetary gear reducer 27 is thereby prevented. In this case, torque from the hydraulic motor 24 can be transmitted to the wheel through the first and second planetary gear reducers 26 and 27. In other words, torque inputted into the first sun gear 30 is combined with torque from the first carrier 32 through the plural first planet gears 31, and the combined torque is transmitted to the first ring gear 33. Further, torque from the second carrier 37 is divided and distributed to the second sun gear 35 and the second ring gear 38 through the second planet gears 36. Torque distributed to the second sun gear 35 is transmitted to the first carrier 32. Torque distributed to the second ring gear 38 is combined with torque from the first ring gear 33, and the combined torque is transmitted to the wheel. Reflection force of the torque of the second carrier 37 is applied to the stationary housing 39 through the hydraulic clutch mechanism 28.

As described above, in the present exemplary embodiment, the torque transmitted by the first planetary gear reducer 26 and the torque transmitted by the second planetary gear reducer 27 are combined and the combined torque is transmitted to the wheel.

Further, the hydraulic clutch mechanism 28 is switched into the clutch-off state when supply of the hydraulic pressure to the piston 73 is stopped and the hydraulic pressure is drained. in the clutch-off (brake-off) state of the hydraulic clutch mechanism 28, rotation of the second carrier 37 of the second planetary gear reducer 27 is permitted. Even when torque is herein inputted from the hydraulic motor 24, the second carrier 37 is rotated while the second planet gears 36 are rotated and revolved. Therefore, torque is prevented from being transmitted from the first and second planetary gear reducers 26 and 27 to the wheel.

Features (1) In the power transmission device, the wheel is driven by both of the torque from the first planetary gear reducer 26 and that from the second planetary gear reducer 27. In other words, unlike the well-known power transmission devices, the present power transmission device is not structured for circulating torque therethrough. Therefore, the power transmission device can reduce torque to be transmitted by the second planetary gear reducer 27. The power transmission device can be thereby compactly formed.

(2) In the hydraulic clutch mechanism 28, the hydraulic circuit 84 is funned in the motor housing 40 and the clutch housing 70, and both of the motor housing 40 and the clutch housing 70 are fixed. Therefore, the motor housing 40 and the clutch housing 70 can be reliably sealed by a simple structure. Specifically, oil leakage can be inhibited only by attaching the paired seal rings 91 onto the motor housing 40.

(3) In the first and second planetary gear reducers 26 and 27, the first support pins 54 supporting the first planet gears 31 and the second support pin 62 supporting the second planet gears 36 are disposed in radially different positions while being overlapped in the axial direction. Therefore, the power transmission device can be compactly formed in the axial direction.

Further, the first and second carriers 32 and 37 are overlapped in the radial direction. Yet further, the thrust washer 56 is disposed between the overlapped portions of the first and second carries 32 and 37 while slidably making contact with the first and second carriers 32 and 37. With the structure, distance between the first and second carriers 32 and 37 can be reduced to the thickness of the thrust washer 56. Therefore, the power transmission device can be further compactly formed in the axial direction.

Other Exemplary Embodiments

The present invention is not limited to the abovementioned exemplary embodiment, and a variety of changes or modifications can be made without departing from the scope of the present invention.

For example, the present invention is applied to the motor grader in the aforementioned exemplary embodiment. However, the present invention can be similarly applied to any other suitable work vehicles including tires (wheels) and a power transmission device configured to switch driving between an on-state and an off-state.

In a power transmission device for a work vehicle, it is herein possible to achieve efficient torque transmission and a seal structure of a hydraulic circuit continued to a hydraulic clutch mechanism with a simple structure.

What is claimed is:

1. A power transmission device for a work vehicle configured to transmit torque from a driving source to a wheel, the power transmission device comprising:
a first planetary gear reducer configured to receive the torque inputted from the driving source and transmit the torque to the wheel, the first planetary gear reducer including:
a first sun gear coupled to the driving source;
a plurality of first planet gears meshed with the first sun gear;
a first carrier supporting the plural first planet gears in a rotatable state; and
a first ring gear meshed with the plural first planet gears, the first ring gear being coupled to the wheel;
a second planetary gear reducer configured to transmit the torque to the wheel together with the first planetary gear reducer, the second planetary gear reducer including:
a second sun gear coupled to die first carrier;
a plurality of second planet gears meshed with the second sun gear;
a second carrier supporting the plural second planet gears in a rotatable state; and
a second ring gear meshed with die plural second planet gears, the second ring gear being coupled to the wheel; and
a hydraulic clutch mechanism including:
a rotary part coupled to the second carrier; and
a stationary part configured to be coupled to or decoupled from the rotary part.

2. The power transmission device for a work vehicle according to claim 1, wherein
the first planetary gear reducer and the second planetary gear reducer are aligned in a rotary axis direction,
the first planetary gear reducer further includes a plurality of first support shafts, each of the first support shafts supporting each of the first planet gears in a rotatable state with respect to the first carrier,
the second planetary gear reducer further includes a plurality of second support shafts, each of the second support shafts supporting each of the second planet gears in a rotatable state with respect to the second carrier, and
the first support shafts and the second support shafts are axially overlapped.

3. The power transmission device for a work vehicle according to claim 2, wherein
the first carrier and the second carrier are radially overlapped, and
the power transmission device further includes a thrust washer, disposed between radially overlapped portions of the first and second carriers, both faces of the thrust washer respectively making contact with the first and second carriers.

* * * * *